United States Patent [19]
Moh et al.

[11] Patent Number: 5,502,361
[45] Date of Patent: Mar. 26, 1996

[54] LOAD CURRENT LIMITING CIRCUIT FOR PWM CONTROLLED BRUSHLESS MOTOR

[75] Inventors: Sungwon R. Moh, Wilton; Scott T. Potter, Southport; Frank D. Ramirez, Stamford; Edilberto I. Salazar, Brookfield, all of Conn.

[73] Assignee: Pitney Bowes Inc., Stamford, Conn.

[21] Appl. No.: 298,863

[22] Filed: Aug. 31, 1994

Related U.S. Application Data

[63] Continuation-in-part of Ser. No. 18,597, Feb. 17, 1993, Pat. No. 5,382,890.

[51] Int. Cl.$^6$ ....................................... H02P 5/06
[52] U.S. Cl. .......................... 318/254; 318/439; 388/811
[58] Field of Search ..................................... 318/254, 439, 318/134, 434, 798–815, 599; 388/804, 811, 819, 829; 363/40, 41

[56] References Cited

U.S. PATENT DOCUMENTS

| | | | |
|---|---|---|---|
| 3,629,633 | 12/1971 | O'Callaghan | 318/6 X |
| 3,870,945 | 3/1975 | Pederson et al. | 318/254 X |
| 4,342,952 | 8/1982 | Bowie | 318/599 X |
| 4,577,164 | 3/1986 | Grib | 318/128 X |
| 4,656,572 | 4/1987 | Caputo et al. | 318/802 X |
| 5,296,796 | 3/1994 | Clower | 318/808 |
| 5,382,890 | 1/1995 | Moh et al. | 318/254 |

*Primary Examiner*—Jonathan Wysocki
*Attorney, Agent, or Firm*—Charles G. Parks, Jr.; David E. Pitchenik; Melvin J. Scolnick

[57] ABSTRACT

A circuit for controlling a current in a load, the circuit includes: structure for connecting the circuit to a source of power, the power source connecting structure including a power switch having off and on operating modes; structure for connecting the circuit to a supply of a pulse width modulated (PWM) control signal, the PWM supply connecting structure including an AND gate having first and second input structure and an output structure, one of the first and second input structures connected for receiving the PWM control signal, and the AND gate output structure connected to the power switch for operating the switch; structure for monitoring the current in the load, the monitoring structure including a differential amplifier, the differential amplifier having an instantaneous output voltage signal proportional to the load current when the power switch is in the on operating mode, structure for comparing a value derived from the instantaneous signal to a high reference voltage signal and a low reference voltage signal and providing a first comparison signal, structure for providing a peak reference voltage signal in response to the first comparison signal, structure for comparing the peak reference voltage signal and instantaneous output voltage signal and providing a second comparison signal; and structure for providing a signal corresponding to the second comparison signal to the other of the first and second input structures of the AND gate for operating the power switch in consideration of the comparison between the peak reference voltage signal and instantaneous output voltage signal.

10 Claims, 3 Drawing Sheets

LOAD CURRENT LIMITING CIRCUIT FOR PWM CONTROLLED BRUSHLESS MOTOR

This application is related to and is a Continuation In Part of U.S. patent application Ser. No. 018,597 for an Integrated Circuit Driver For a Brushless Motor, filed Feb. 17, 1993 by Moh et al., now U.S. Pat. No. 5,382 890 and assigned to the assignee of the present invention. And, the subject matter of the aforesaid related Application is hereby incorporated herein by reference.

BACKGROUND OF THE INVENTION

This invention is generally concerned with a load current control circuit, and more particularly with a current control circuit for a load including means for limiting the current therein.

As discussed in the related Patent Application, it is desirable to provide a current control circuit including provision for controlling the motor winding current of a brushless motor, such that the high acceleration and starting torque demands made on the motor in a given motor application may be met, while protecting the motor winding against thermal overloading. In this connection it is noted that in order to achieve high acceleration and starting torque values, the motor winding current may be peaked at a value which is an order of magnitude greater than the rated current value, so long as the peak value is not maintained for a time interval sufficient to permit the motor winding to reach the thermal breakdown temperature on which the rated current value is based.

In the course of providing the aforesaid current limiting circuit in the environment of driving a brushless motor, it became apparent that there were numerous additional engineering applications wherein the current limiting circuit is useful. For example, to control the current delivered to any inductive load, driver or other load, in an application which normally calls for the provision of a continuous current value in the load and intermittently calls for the provision of a peak current value therein.

With the above thoughts in mind, in accordance with the present invention there is provided a current limiting circuit which is useful in the motor application shown and described in the aforesaid related Patent Application. More generally, the present invention provides a current control circuit which preferably includes structure for monitoring the current in a load with a view to limiting the continuous current values therein to values within the range of a predetermined high value and a predetermined low value to ensure that the continuous current value does not exceed the continuous peak current value rating of the load, whereby peak current values may flow in the load for short time intervals to accommodate the high current demands of the load.

Accordingly:

an object of the invention is to provide a current control circuit for a load, and another object is to provide a load current control circuit including means for limiting the average or RMS value of a voltage proportional the average or RMS value of continuous current in the load, to a value which is between a predetermined high current value and a predetermined low current value, whereby the continuous current value may be intermittently peaked.

SUMMARY OF THE INVENTION

A circuit for controlling a current in a load, the circuit comprising, means for connecting the circuit to a source of power, the power source connecting means including a power switch having off and on operating modes; means for connecting the circuit to a supply of a pulse width modulated (PWM) control signal, the PWM supply connecting means including an AND gate having first and second input means and an output means, one of the first and second input means connected for receiving the PWM control signal, and the AND gate output means connected to the power switch for operating the switch; means for monitoring the current in the load, the monitoring means including a differential amplifier, the differential amplifier having an instantaneous output voltage signal proportional to the load current when the power switch is in the on operating mode, means for comparing a value derived from the instantaneous signal to a high reference voltage signal and a low reference voltage signal and providing a first comparison signal, means for providing a peak reference voltage signal in response to the first comparison signal, means for comparing the peak reference voltage signal and instantaneous output voltage signal and providing a second comparison signal; and means for providing a signal corresponding to the second comparison signal to the other of the first and second input means of the AND gate for operating the power switch in consideration of the comparison between the peak reference voltage signal and instantaneous output voltage signal.

BRIEF DESCRIPTION OF THE DRAWINGS

As shown in the drawings, wherein like reference characters designate like or corresponding parts throughout the several views.

DESCRIPTION OF THE PREFERRED EMBODIMENT

Figure 1:
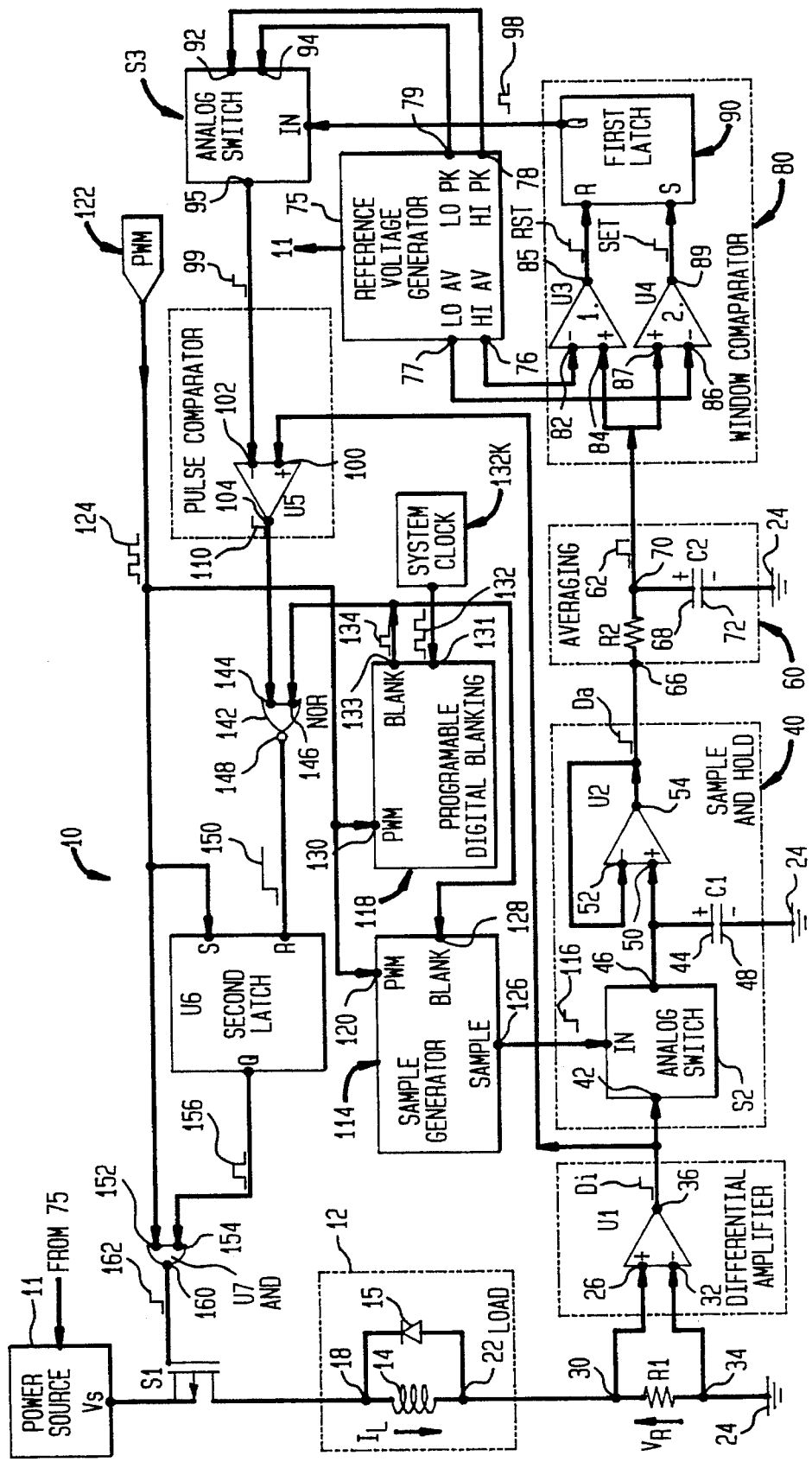
FIG. 1 is a schematic diagram of a load current control circuit according the invention.

As shown in FIG. 1, the load current control circuit 10 is an integrated circuit which is adapted to be connected to a source of supply of power 11, a pulse-width modulated signal source (PWM) and electrical load 12. Although the load 12 may be any inductive load or amplifier, or other electrical load, for the purposes of this disclosure, the load 12 is represented by a motor winding 14 and a diode 15 connected in parallel therewith.

The current control circuit 10 (FIG. 1) includes a power switch S1 which is preferably a P-channel MOS FET but may be any power switch which is responsive to an AND gate output signal. The power switch S1 is connected between, and thus in series with, the external power supply 11, which has a voltage Vs, and one side 18 of the load 12. And, the control circuit 10 additionally includes a load current sensing resistor R1 connected between, and thus is series with, the other side 22 of the load 12 and a sink 24.

For sensing the voltage drop Vr (FIG. 1 ) across the current sensing resistor R1, the circuit 10 includes a differential amplifier U1 having its positive terminal 26 connected to the high voltage side 30 of the resistor R1, and thus between the load 12 and resistor R1, and having its negative terminal 32 connected to the low voltage side 34 of the resistor R1, and thus between the resistor R1 and sink 24. The differential amplifier U1 provides an instantaneous analog output voltage signal Di at its output terminal 36 which is proportional to the instantaneous forward load current I1 when the power switch S1 (FIG. 1) is closed, that is, during the MOS FET "on" time. However, during the MOS FET "off" time, the current I1 in the motor winding 14 flows through the diode 15, and thus recirculates through the winding 14, i.e., known as "flyback" current, rather than flowing in the resistor R1. Accordingly, the voltage drop Vr across the resistor R1 is proportional to the instantaneous motor winding current I1 only when the power switch S1 is closed. Since a discontinuous voltage Vr cannot be used in the derivation of an average or RMS motor winding voltage, the control circuit 10 includes structure 40 for sampling the instantaneous voltage signal Di, when the power switch S1 is closed and after the signal Di is free of discontinuities, and is thus a "valid" signal, and for holding the sampled instantaneous voltage signal Di when the signal Di is an "invalid" signal, that is, while the power switch S1 is opened and just after the power switch S1 is closed, and thus when the instantaneous voltage signal Di includes discontinuities.

The sampling and holding structure 40 (FIG. 1) includes an analog switch S1 having one terminal 42 connected in series with the output terminal 36 of the differential amplifier U1. In addition, the sampling and holding structure 40 includes a holding capacitor C1 having its positive side 44 connected to the other switch terminal 46 and having its negative side 48 connected to the sink 24, whereby the capacitor C1 is connected in shunt with the sampling switch S2 when the switch S1 is closed. In addition, the sampling and holding structure 40 includes a unity gain amplifier, or buffer, U2 having its positive terminal 50 connected to the positive side 44 of the holding capacitor C1 and its negative terminal 52 connected to the buffer output terminal 54. As thus constructed and arranged, when the sampling switch S1 is closed, the holding capacitor C1 is charged from the differential amplifier U1 to a voltage level which is proportional to the motor winding current I1. On the other hand, when the sampling switch S1 is opened the buffer U2 presents a high impedance to the holding capacitor C1 to prevent its discharge. Thus the buffer U2 provides a steady-state output voltage signal Ds which is equal to the sampled instantaneous input signal Di. Moreover, due to the motor winding current I1 recirculating through the diode 15 when the power switch S1 is opened, the output voltage signal Ds is substantially exactly proportional to the motor winding current I1 at every instant of time, based upon the assumption, verified by the inventors herein, that the flyback current is substantially equal to the forward current I1. Accordingly, the sampling and holding structure 40 samples an instantaneous signal Di and holds a "valid" steady-state signal Ds which is proportional to the value of the motor winding current I1.

The control circuit 10 (FIG. 1) further includes structure 60 for deriving an average or RMS voltage signal 62, from the steady-state sample voltage signal Ds, for use in comparison with acceptably high and low average or RMS reference voltage signals. Preferably, an average, rather than RMS, voltage signal 62 is derived, since it is less costly to do so. Accordingly, the control circuit 10 preferably includes a simple RC averaging circuit 60. The RC circuit 60 includes an input resistor R2 having one side 66 connected in series with the buffer output terminal 54. In addition, the RC circuit 60 includes a capacitor C2 having its positive side 68 connected to the other side 70 of the resistor R2 and its negative side 72 connected to the sink 24, whereby the capacitor C2 is connected in shunt with the resistor R2 for charging therethrough to an average output voltage signal 62 which corresponds to the average value of the buffer output signal Ds received from the sampling and holding structure 40.

For making a plurality of reference voltage signals available to the control circuit 10 (FIG. 1), the control circuit 10 may include, or the external power source 11 may be modified to include, conventional structure 75, connected to the power source 16 for energization therefrom, for generating a plurality of predetermined reference voltage signals, including high and low average reference voltage signals, HiAv and LoAv, at the reference voltage generator terminals 76 and 77, and high and low peak reference voltage signals, HiPk and LoPk, at the generator terminals 78 and 79. Of course, if an RMS, rather than average voltage signal is derived, then, HiRMS and LoRMS rather than HiAv and LoAv signals would be generated by the generating structure 75.

For comparing the average output signal 62 (FIG. 1) to the predetermined high and low average reference voltage signals, HiAv and LoAv, the control circuit 10 preferably includes a window comparator 80. The window comparator 80 includes first and second comparators U3 and U4. The first comparator U3 has positive and negative input terminals 82 and 84, and an output terminal 85, and the second comparator U4 has positive and negative input terminals 86 and 87, and an output terminal 89. One of the comparators, for example, the first comparator U3, has its positive input terminal 84 connected to the signal averaging circuit 60 for receiving the average voltage signal 62, and the other, or second, comparator U4 has its negative input terminal 87 connected to the signal averaging circuit 60 for also receiving the average voltage signal 62. In addition, the first comparator U3 has it negative input terminal 82 connected to the reference voltage generator's HiAv terminal 76, for receiving therefrom the high average reference voltage signal, HiAv, and the second comparator U4 has it positive input terminal 86 connected to the reference voltage generator's LoAv terminal 77, for receiving therefrom the low average reference voltage signal, LoAv. The window comparator 80 additionally includes a first conventional latch 90, having a reset terminal "r", to which the first comparator output terminal 85 is connected, having a set terminal "s", to which the second comparator output terminal 89 is connected, and having an output terminal "Q".

The control circuit 10 (FIG. 1) also includes an analog peak voltage foldback switch S3, having a first input terminal 92, which is connected to the reference voltage generator's HiPk terminal 78 for receiving the high peak reference voltage signal HiPk, having a second input terminal 94, which is connected to the reference voltage generator's LoPk terminal 79 for receiving the low peak reference voltage signal, LoPk, and having a common output terminal 95. In addition, the peak voltage foldback switch S3 includes a switch operating input signal terminal, IN, which is conventionally connected to the output terminal "Q" of the first latch 90. As hereinafter discussed in greater detail, the peak voltage fold back switch S3 receives successive comparator output signals, such as the signal 98, from the comparator output terminal Q, in response to each transition state of the comparator's latch 90, for successively switching the foldback switch's output signal 99, at the output terminal 95, between the respective peak reference voltage signals, HiPk and LoPk.

Figure 2:
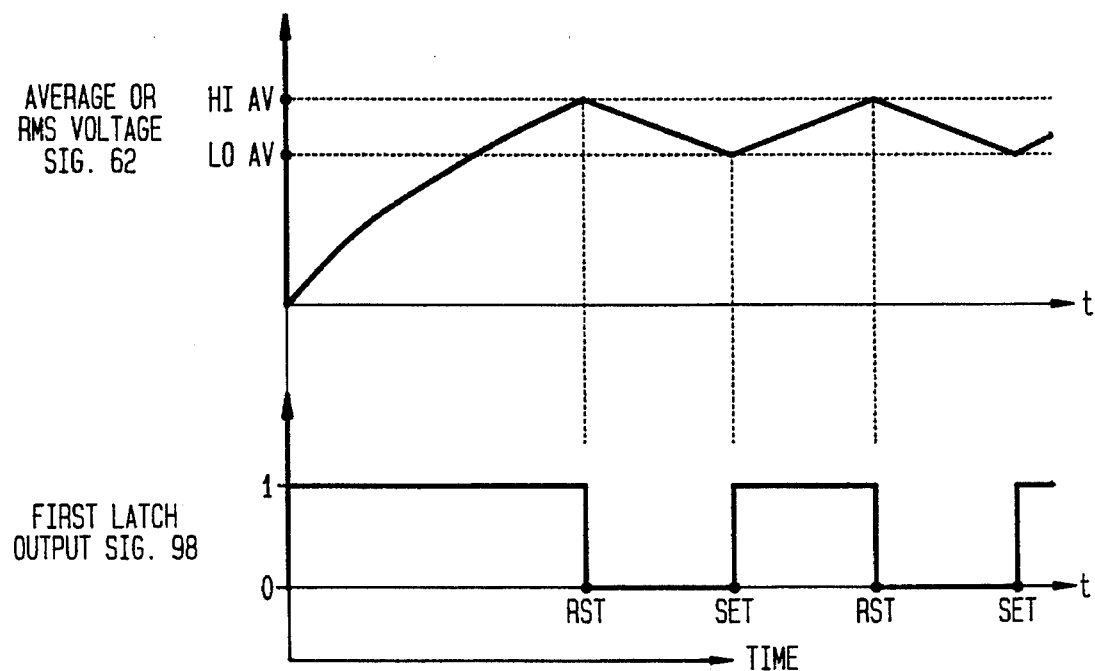
FIG. 2 is a schematic diagram of the input and output signals of the window comparator of the control circuit of FIG. 1.

As shown in FIGS. 1 and 2, assuming closure of the power switch S1, and thus energization of the motor winding 14 from the power supply 11, and operation of the sampling switch S2 as hereinafter discussed, then, as the average voltage signal 62 increases, due to the capacitor C2 being charged, the average output voltage signal 62, at the positive input terminal 84 of the first comparator U3 and at the negative input terminal 87 of the second comparator U4, passes through the level of the low average reference voltage signal, LoAv, and reaches the level of the high average reference voltage signal, HiAv. Whereupon the first comparator U3 fires and provides a reset signal RST to the first latch 90. As a result, the first latch 90 undergoes a change of state and provides an input operating signal 98 to the foldback voltage switch S3, causing the switch S3 to operate and apply the low peak reference voltage signal, LoPk, to the switch output terminal 95. Thus the switch output signal 99 becomes the low peak reference voltage signal LoPk. Thereafter, the average voltage signal 62 decreases, due to the charge on the capacitor C2 decaying to the level of the low average voltage signal, LoAv, with the result that the signal 62 at the first and second comparator input terminals 84 and 87 correspondingly decreases, and the second comparator U4 fires to provide a set signal, SET, to the first latch 90.

Whereupon the first latch 90 again changes state and provides another input operating signal 98 to the foldback switch S3, causing the switch S3 to operate and apply the high peak reference voltage signal, HiPk, to the switch output terminal 95 and thereby change the switch output signal 99 from the high peak reference voltage signal, HiPk, to the low peak references voltage signal, LoPk. As a result, the average output voltage signal 62 again increases as the capacitor C2 charges to the level of the HiAv signal, and the first comparator U3 again fires to provide the reset signal RST to the latch 90 for operating the foldback switch S3 and changing the output signal 99 to the low peak reference voltage signal, LoPk, and so on, until the load 12 is no longer being energized. Thus the value of an average continuous voltage signal 62, which corresponds to the average continuous current l1 in the motor winding 14, is limited to fluctuating between values corresponding to predetermined voltage reference values, HiPk and LoPk, whenever the load 12 is energized, whereby the continuous current l1 in the load 12 may be intermittently peaked without damaging the load 12.

For timely operating the sampling switch S2, the control circuit 10 includes structure 114 for generating a sampling clock signal, such as the signal 116, for operating the sampling switch S2, and includes programmable structure 118 for digitally blanking the sampling signal 116 until the load current l1 is free of discontinuities.

The sample clock generator 114 (FIG. 1) includes an input terminal 120 which is connected to the pulse width modulated (PWM) signal source 122 for receiving therefrom a pulse width modulated control signal, such as the signal 124, whenever the source 122 is active. In addition, the sample clock generator 114 includes a sample signal output terminal 126 which is connected to the input terminal, IN, of the sampling switch S2 for providing respective signals thereto, such as the signal 116, for operating the sampling switch S2. And, the sample clock generator includes a blanking signal input terminal 128.

The digital blanking structure 118 (FIG. 1) includes an input terminal 130 which is connected to the PWM signal source 122 for receiving therefrom the PWM control signal 124 whenever the source 122 is active. In addition, the digital blanking structure 118 includes an input terminal 131 for receiving an output signal 132 from a conventional system clock circuit 132A whenever the control circuit 10 is energized. And, the digital blanking structure 118 includes an output terminal 133 for providing a blanking signal, such as the signal 134, to the sample generator's blanking signal input terminal 128.

In operation, when the control circuit 10 is energized and the PWM source 122 is active, the digital blanking structure 118 receives a PWM signal 124 at terminal 130 from the source 122 and a clock signal 132 at terminal 131 from the system clock circuit 132A. The blanking circuit 118 is preferably constructed and arranged for successively ignoring the PWM input signal 124 during successive time periods corresponding to the first three clock cycles commencing with the leading edge of each positively rising input pulse of the PWM input signal 124, followed by applying the remainder of each successive positive pulse of the PWM input signal 124 to the blanking terminal 133. The resulting output signal 134 at terminal 133 is received by the sample generator 114 at its blanking input signal terminal 128. And, the sample generator 114 is conventionally constructed and arranged to generate a sampling signal 116 for operating the switch S2 during successive time intervals corresponding to the time periods that the PWM input signal 124 is positive, or high, and the blanking input signal 128 is low. Thus the sampling switch, S2 is successively operated for time intervals of three clock cycles less than the time period of each positive pulse of the PWM input signal 124 to the sample generator 114, in order to avoid operation of sampling switch S2, and thereby avoid sampling the voltage signal Di, corresponding to the instantaneous load current l1, when the FET power switch S1 starts to turn "on". Preferably, the digital blanking structure 118 is programmable for changing the blanking time period to either more or less of a time period than the time period corresponding to the three clock cycles aforementioned, depending upon the nature of the load 12 being controlled by the control circuit 10.

For comparing the instantaneous voltages signal Di (FIG. 1) to the respective high and low peak values, HiPk and LoPk. The control circuit 10 preferably includes a pulse by pulse comparator U5. The comparator U5, has a positive input terminal 100, which is connected to the differential amplifier's output terminal 36 for receiving the instantaneous output voltage signal Di, having a negative input terminal 102, which is connected to the foldback voltage switch's common terminal 95, and having an output terminal 104. Whenever the power switch S1 is closed, the instantaneous output voltage signal Di from the differential amplifier U1 is applied to the positive input terminal 100 of the pulse comparator U5 for comparison with the input voltage signal 99 from the foldback switch S3. Since the instantaneous voltage signal Di may exceed the level of the reference voltage signal 99 whether it is a HiPk or LoPk signal 99, the pulse comparator U5 may fire when the input voltage signal 99 exceeds either the high peak or low peak reference voltage signal, HiPk or LoPk. Accordingly, the pulse comparator U5 provides an output signal 110 on a pulse by pulse basis whenever the instantaneous voltage signal Di exceeds the level of the input reference voltage signal 99.

Figure 3:
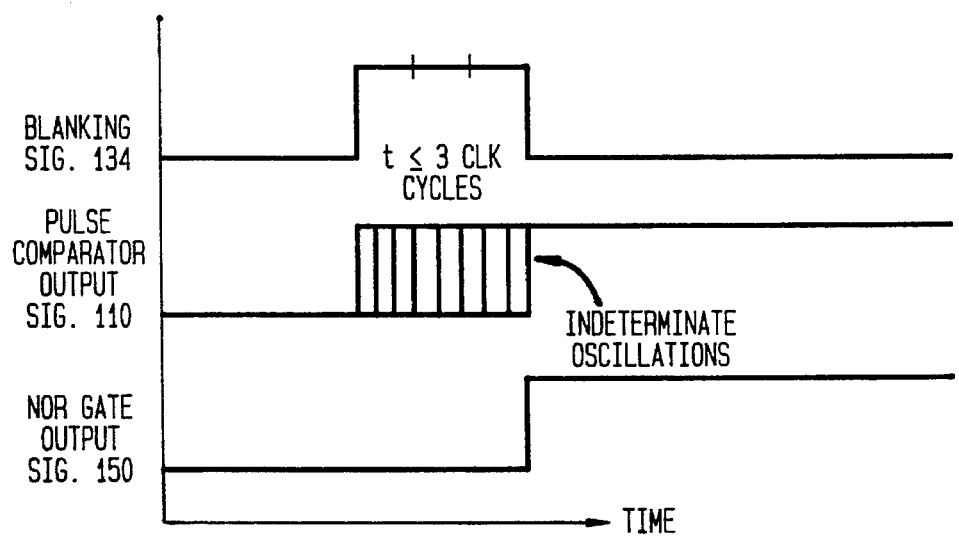
FIG. 3 is a schematic diagram of the input and output signals of the NOR gate of the control circuit of FIG. 1.

In addition, the control circuit 10 (FIG. 1) includes a NOR gate 142 having a first input terminal 144 connected to the pulse comparator's output terminal 104, for receiving the output signal 110, and having a second input terminal 146 conventionally connected for receiving the digital blanking signal 134. Moreover, the NOR gate 142 includes an output terminal 148 which, as shown in FIG. 3, is active for providing an output signal 150 when the pulse comparator's output signal 110 is received and the blanking signal 134 is ended, to ensure that the NOR gate output signal 150 is free of oscillations.

Moreover, the control circuit 10 (FIG. 1) includes a second conventional latch U6, including a set terminal "S", which is connected to the pulse width modulated (PWM) signal source 122 for receiving therefrom the PWM control signal 124 whenever the source 122 is active. In addition, the second latch U6 includes a reset terminal "R" which is connected to the output terminal 148 of the NOR gate 142 for receiving therefrom the output signal 150. And, the second latch U6 includes an output terminal "Q". Further, the control circuit 10 includes an AND gate U7, having one input terminal 152 which is connected to the PWM signal source 122 for receiving therefrom the PWM control signal 124 whenever the source 122 is active. In addition, the AND gate U7 includes another input terminal 154, which is connected to the output terminal "Q" of the second latch U6 for receiving therefrom an output signal, such as the signal 156, whenever the second latch U6 undergoes a change of state. Further, the AND gate U7 has an output terminal 160 which is connected to the power switch S1 for the operation thereof.

Figure 4:
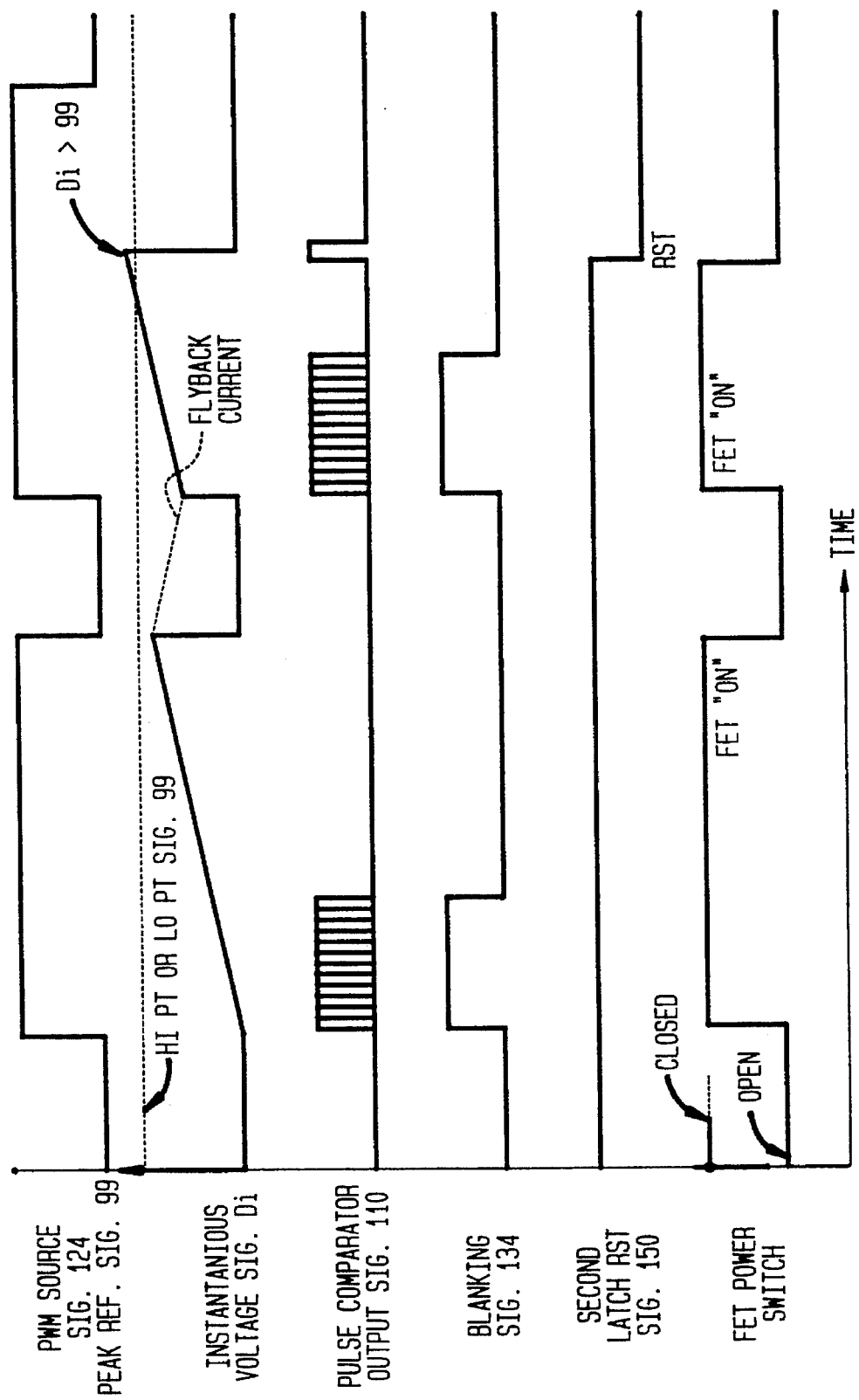
FIG. 4 is a schematic diagram of the output signals of the control circuit of FIG. 1 which are most relevant for operating the power switch.

As shown in FIGS. 1 and 4, whenever the PWM source is active, the PWM signal 124 is applied to the input terminal 152 of the AND gate U7 for operation thereof during the on time, i.e., each successive positive pulse, of the PWM signal 124. However, in order to operate the AND gate U7, a positive, or one, level input signal 156 must be received from the second latch U6. And, this occurs when the second latch U6 is set. Assuming the power switch S1 is operated, or "on", due to the AND gate U7 having operated and applied a switch operating signal 162 to the power switch S1, then, during each duty cycle of the PWM signal 124, the instantaneous output voltage signal Di from the differential amplifier U1, which is proportional to the load current l1, continuously increases. However, depending on the time interval during each cycle of the PWM signal 124 that the signal 124 is positive, the load current l1 may or may not decay to zero during the time interval between positive PWM pulses, when the switch S1 is closed. Assuming, for example, the 75% duty cycle shown in FIG. 4, although the instantaneous voltage Di, and thus the forward load current l1 becomes zero, the flyback current does not decay to zero during the time interval between positive pulses of the PWM signal 124. Accordingly, the signal Di, and thus the load current l1 commences rising from a positive winding current value, with the result that at some time during the next positive pulse of the PWM signal 124, the instantaneous voltage signal Di, passes the level of the high or low peak reference signal 99. Whereupon the NOR gate 142 is operated and applies a reset signal 150 to the second latch U6 causing the latch U6 to operate and apply a negative output signal 156 to the AND gate input terminal 154. As a result, the AND gate output signal 162 is ended and the switch S1 is opened, i.e., the FET is turned "off". Whereupon the load current l1 commences decaying, as the instantaneous voltage signal Di falls, to zero during the remainder of the positive pulse of the PWM signal 124. Thereafter, i.e. during the next cycle of the PWM signal 124, since both the instantaneous voltage signal Di and load current l1 shall have decreased to zero, the AND gate U7 will operate in response to the latch U6 being set by the PWM signal 124, and the aforesaid process is repeated.

A more detailed discussion of components of the control circuit 10 may be found in the related patent application, which, as previously noted, is incorporated herein by reference.

In accordance with the objects of the invention there has been disclosed a current control circuit for a load and, more particularly, a control circuit which includes means for limiting the average or RMS value of a voltage proportional to the average or RMS value of continuous current in the load, to a value which is not more than a predetermined high current value and not less than a predetermined low current value, whereby the continuous current value may be intermittently peaked.

What is claimed is:

1. A circuit for controlling a current in a load, the circuit comprising:

a. means for connecting the circuit to a source of power, the power source connecting means including a power switch having off and on operating modes;

b. means for connecting the circuit to a supply of a pulse width modulated (PWM) control signal, the PWM supply connecting means including an AND gate having first and second input means and an output means, one of the first and second input means connected for receiving the PWM control signal, and the AND gate output means connected to the power switch for operating the switch;

c. means for monitoring the current in the load, the monitoring means including a differential amplifier, the differential amplifier having an instantaneous output voltage signal proportional to the load current when the power switch is in the on operating mode;

d. means for comparing a value derived from the instantaneous signal to a high reference voltage signal and a low reference voltage signal and providing a first comparison signal;

e. means for providing a peak reference voltage signal in response to the first comparison signal;

f. means for comparing the peak reference voltage signal and instantaneous output voltage signal and providing a second comparison signal; and g. means for providing a signal corresponding to the second comparison signal to the other of the first and second input means of the AND gate for operating the power switch in consideration of the comparison between the peak reference voltage signal and instantaneous output voltage signal.

2. The circuit according to claim 1, wherein the value derived from the instantaneous signal is an average value, and the high and low reference voltage signals are respectively high average and low average signals.

3. The circuit according to claim 1, wherein the value derived from the instantaneous signal is an RMS value, and the high and low reference voltage signals are respectively high RMS and low RMS signals.

4. The circuit according to claim 1, including means for sampling the instantaneous signal when the power switch is in the on operating mode, and means for holding the sampled instantaneous signal when the power switch is in the off operating mode.

5. The circuit according to claim 4, wherein the value derived from the instantaneous signal is an average value of the held instantaneous signal, and the high and low reference voltage signals are respectively high average and low average signals.

6. The circuit according to claim 4, wherein the value derived from the instantaneous signal is an RMS value of the held instantaneous signal, and the high and low reference voltage signals are respectively high RMS and low RMS signals.

7. The circuit according to claim 4, wherein the sampling means includes a sampling switch having an open mode of operation and a closed mode of operation, the sampling switch is in the closed mode of operation when the power switch is in the on mode of operation, and the sampling switch is in the open mode of operation when the power switch is in the off mode of operation.

8. The circuit according to claim 7, wherein the holding means includes a capacitor which charges when the sampling switch is in the closed mode of operation, and the sampling means including a unity gain amplifier for preventing discharge of the capacitor when the sampling switch is in the open mode of operation.

9. The circuit according to claim 7, wherein the sampling means includes means for operating the sampling switch, the sampling switch operating means connected for receiving the PWM control signal, the circuit including a clock means having an output clock signal, the sampling switch operating means connected for receiving the clock signal, and the sampling switch operating means including means for providing a sampling switch operating signal to the sampling switch for closing the sampling switch during each positive pulse of the PWM signal after the lapse of a predetermined number of clock cycle signals commencing from the leading edge of the each positive pulse.

10. The circuit according to claim 1, including a latch, the latch including a set input terminal connected for receiving the PWM input signal for setting the latch. The latch including a reset terminal connected for receiving the second comparison signal for resetting the latch, the latch including an output terminal connected to the other of the first and second input structures of the AND gate, the AND gate operating the power switch for switching thereof to the on operating mode when the latch is set, and the AND gate operating the power switch for switching thereof to the off operating mode when the latch is reset, whereby the power switch is switched to the off operating modes in consideration of the comparison between the peak reference voltage signal and instantaneous output voltage signal.

* * * * *